Patented Oct. 30, 1928.

1,689,526

UNITED STATES PATENT OFFICE.

ALFRED W. GAUGER, OF TOTTENVILLE, AND HENRY HERMAN STORCH, OF NEW YORK, N. Y., ASSIGNORS TO BURNHAM CHEMICAL COMPANY, OF RENO, NEVADA, A CORPORATION OF NEVADA.

PROCESS OF OBTAINING SODIUM CARBONATE SULPHATE.

No Drawing. Application filed January 9, 1926. Serial No. 80,345.

Our invention relates to a method of recovering sodium carbonate sulphate from saline liquor containing the same and other salts.

An object of our invention is to provide an economical process of obtaining sodium carbonate sulphate.

Another object of our invention is to provide a process of obtaining substantially pure sodium carbonate sulphate from brine containing the same and other salts.

A further object of our invention is to provide a process of obtaining sodium chloride and sodium carbonate sulphate from brine containing the same, each salt being substantially free from the other salt.

The invention possesses other advantageous features, some of which with the foregoing will be set forth at length in the following description where we shall outline in full the preferred form of the process of our invention.

Broadly speaking, the process of our invention comprises concentrating a brine containing sodium chloride and sodium carbonate sulphate ($2Na_2SO_4.Na_2CO_3$) to crystallize out a substantial amount of sodium chloride, and then treating the brine to crystallize out sodium carbonate sulphate.

We shall describe our process as it is practiced with the brine occurring subterraneously at Searles Lake, California, and which is a liquor containing sodium, potassium, carbonate, sulphate and chloride ions, but our process, it will be understood, is also applicable to other saline liquors.

Searles Lake brine is similar in many respects to an ordinary saline solution and behaves generally in a similar manner, but probably due to the continuous association and dissociation of the various ions and molecules it contains, fractional crystallization is complicated and any one or more of a number of salts may crystallize out at a given concentration of the liquor, depending upon other factors. Sodium chloride crystallizes out on concentration of the liquor by evaporation, and is usually the first salt to crystallize out.

It has been found difficult in crystallizing the salts from the brine to keep sodium chloride from crystallizing out also and adulterating the desired product. According to our process, which will be described as it is used to obtain sodium carbonate sulphate, we first treat the crude brine to prevent the contamination of the desired sodium carbonate sulphate by sodium chloride.

The crude Searles Lake subterranean brine is pumped into a large deep pond to be evaporated by the action of the sun and wind. As the brine becomes more and more concentrated, sodium chloride crystallizes out of the solution and the crystals gather on the bottom and sides of the pond from which they may be removed by any of the usual methods. Since the volume of the pond is large, in proportion to the area exposed, its temperature remains practically constant during day and night and is usually in the neighborhood of 20 to 25 degrees centigrade. In this temperature range, sodium carbonate sulphate has a high solubility, and its presence in the brine is not apparent in fact it is doubtful whether the various ions have associated themselves together to form this salt. At this temperature the ions have apparently associated themselves to form sodium potassium sulphate ($KNaSO_4$) usually termed glaserite. This salt may crystallize in several different forms from Searles Lake brine and crystals of the following formulæ have been formed, to wit $K_3Na(SO_4)_2$ and $K_4Na_2(SO_4)_3$. It is desirable to concentrate the brine to crystallize out as much sodium chloride as possible and to increase the concentration of the carbonate and sulphate ions. This concentration is preferably continued at these or lower temperatures, until the brine becomes saturated or substantially saturated with glaserite, after which the brine is treated to crystallize out sodium carbonate sulphate. This is preferably accomplished by raising the temperature of the brine to approximately 30° centigrade or higher, and if the temperature rise is accomplished without evaporation, sodium chloride will not crystallize out with the sodium carbonate sulphate.

This is usually effected by flowing the brine from the deep pond into a shallow pond, usually of from two to six inches in depth, wherein, upon exposure of the brine to the sun, the temperature of the liquor is quickly raised to the desired magnitude. Initially there will be evaporation in the shallow pond, causing the formation of a salt crust over the surface of the pond, thereby minimizing subsequent evaporation. The slight depth of the second pond precludes the possibility of any but gentle surface disturbances which will not break the crust.

The brine from the deep pond is flowed through the shallow pond, under the crust thereon, accomplishing the heating of the brine to the temperature which causes sodium carbonate sulphate to crystallize out and the presence of the crust minimizes evaporation, so that a minimum of sodium chloride is crystallized out.

The crystallized sodium carbonate sulphate gathers on the bottom and sides of the shallow pond from which it may be gathered by any convenient means, and when the salt no longer crystallizes out the brine is discharged from the pond. If care is used to introduce the liquor into the second pond at about the same rate at which it is withdrawn therefrom, the salt crust may be kept intact and the crystallization of sodium carbonate sulphate will then be a continuously operating process.

It will be appreciated that in our process, the saline brine is concentrated in a deep pond to remove sodium chloride, and is then solar heated out of contact with the atmosphere to crystallize sodium carbonate sulphate which is collected in any of the usual ways.

We claim:

1. The process of obtaining a given salt having a decreasing solubility above a certain temperature from a brine containing the same and other salts having an increasing solubility above the certain temperature which comprises heating the brine out of contact with the atmosphere and above the certain temperature.

2. The process of obtaining a given salt having a decreasing solubility above a certain temperature from a brine containing the same and other salts having an increasing solubility above the certain temperature which comprises evaporating the brine to crystallize out other salts, heating the brine without evaporation to crystallize out the given salt, and collecting the crystallized given salt.

3. The process of obtaining a given salt having a decreasing solubility above a certain temperature from a brine containing the same and other salts having an increasing solubility above the certain temperature which comprises evaporating the brine to to crystallize out other salts, separating the brine from the crystallized salts, heating the brine out of contact with the atmosphere to crystallize out the given salt, and collecting the crystallized given salt.

4. The process of obtaining a given salt having a decreasing solubility above a certain temperature from a brine containing the same and another salt having an increasing solubility above the certain temperature which comprises evaporating the brine at a uniform low temperature below said certain temperature to crystallize out the other salt, heating the brine above the certain temperature and out of contact with the atmosphere to crystallize out the given salt, and collecting crystals of the given salt.

5. The process of obtaining sodium carbonate sulphate from brine containing the same and other salts which comprises heating the brine out of contact with the atmosphere and above the temperature of maximum solubility of sodium carbonate sulphate.

6. The process of obtaining sodium carbonate sulphate from brine containing the same and sodium chloride which comprises treating the brine to crystallize out sodium chloride, separating the sodium chloride from the brine, and heating the brine out of contact with the atmosphere to crystallize out sodium carbonate sulphate.

7. The process of obtaining sodium carbonate sulphate from brine containing the same and sodium chloride which comprises evaporating the brine at a low temperature to crystallize out sodium chloride, separating the crystallized sodium chloride from the brine, heating the brine without appreciable further evaporation to crystallize out sodium carbonate sulphate, and collecting the crystallized sodium carbonate sulphate.

8. The process of obtaining sodium carbonate sulphate from brine containing the same and potassium sodium sulphate and saturated with sodium chloride which comprises evaporating the brine to substantial saturation with potassium sodium sulphate thereby crystallizing out a large proportion of sodium chloride, removing the brine from the crystallized sodium chloride, heating the brine without further evaporation and above the temperature of maximum solubility of sodium carbonate sulphate whereby sodium carbonate sulphate is crystallized out, and collecting the crystallized sodium carbonate sulphate.

9. The process of obtaining sodium carbonate sulphate from Searles Lake brine which comprises solar evaporating the brine in a large deep pond to substantial saturation with potassium sodium sulphate, during which operation sodium chloride is crystallized out, allowing the crystallized sodium chloride to collect in the pond, flowing the brine to a shallow pond having a surface salt crust, solar heating the brine beneath the crust above 30° centigrade whereby sodium carbonate sulphate is crystallized out, and discharging the brine from the pond.

10. The process of obtaining sodium carbonate sulphate from Searles Lake brine which comprises evaporating the brine in a container at temperatures at which sodium carbonate sulphate will not crystallize, to deposit sodium chloride, continuing said evaporation to approximate saturation with potassium sodium sulphate, removing the brine to another container and heating the brine without substantial evaporation to crystallize sodium carbonate sulphate.

11. The process of obtaining sodium carbonate sulphate from Searles Lake brine which comprises evaporating the brine in a relatively deep solar pond during spring or summer to crystallize sodium chloride, continuing said evaporation to saturation with potassium sodium sulphate, removing the brine to a shallow pond having a surface salt crust, and solar heating the brine beneath said crust whereby sodium carbonate sulphate is crystallized.

12. The process of obtaining sodium carbonate sulphate from brines containing sodium, carbonate, sulphate and chloride ions and saturated with sodium chloride which comprises evaporating the brine at temperatures which will crystallize sodium chloride, but not any carbonate or sulphate salt, continuing said evaporation to saturation with another salt, removing the brine to another container and heating the brine without appreciable evaporation to crystallize sodium carbonate sulphate.

13. The process of obtaining sodium carbonate sulphate from brine containing the same and sodium chloride which comprises treating the brine to crystallize out sodium chloride, separating the crystallized sodium chloride and the brine, and heating the separated brine out of contact with the atmosphere to crystallize out sodium carbonate sulphate.

In testimony whereof we have hereunto set our hands.

ALFRED W. GAUGER.
HENRY HERMAN STORCH.